United States Patent [19]
Chiang

[11] Patent Number: 6,018,783
[45] Date of Patent: Jan. 25, 2000

[54] REGISTER ACCESS CONTROLLER WHICH PREVENTS SIMULTANEOUS COUPLING OF MORE THAN ONE REGISTER TO A BUS INTERFACE

[75] Inventor: John M. Chiang, San Jose, Calif.

[73] Assignee: Advanced Micro Devices, Inc., Sunnyvale, Calif.

[21] Appl. No.: 08/989,989

[22] Filed: Dec. 12, 1997

[51] Int. Cl.[7] ................................................. G06F 13/38
[52] U.S. Cl. ........................... 710/129; 710/118; 710/130
[58] Field of Search ................................. 395/309, 308, 395/310, 305, 297, 298; 710/117, 118, 125, 128, 129, 130

[56] References Cited

U.S. PATENT DOCUMENTS

| | | | |
|---|---|---|---|
| 4,644,529 | 2/1987 | Amstutz et al. | 370/60 |
| 5,500,946 | 3/1996 | Roden et al. | 395/308 |
| 5,860,108 | 1/1999 | Horikawa | 711/141 |

*Primary Examiner*—Ayaz R. Sheikh
*Assistant Examiner*—Tim Vo
*Attorney, Agent, or Firm*—Monica H. Choi

[57] ABSTRACT

A register access controller controls the timing of coupling a selected register of a plurality of register to a bus interface during a zero-wait continuous burst transfer of data from the plurality of registers to the bus interface. During the zero-wait continuous burst transfer of data, a newly selected register is coupled to the bus interface for each clock period. The register access controller of the present invention introduces a predetermined delay time between decoupling a previously selected register from the bus interface to coupling a newly selected register to the bus interface. In this manner, the register access controller prevents coupling of two registers to the bus interface at the same time thereby reducing the risk of integrated circuit damage that may result from simultaneous coupling of multiple registers to the bus interface.

13 Claims, 3 Drawing Sheets

REGISTER ACCESS CONTROLLER WHICH PREVENTS SIMULTANEOUS COUPLING OF MORE THAN ONE REGISTER TO A BUS INTERFACE

TECHNICAL FIELD

This invention relates to memory registers, and more particularly, to an apparatus and method for controlling timing of coupling a selected register of a plurality of registers to a bus interface to prevent simultaneous coupling of more than one register to the bus interface during a zero-wait continuous burst transfer of data from the plurality of registers to the bus interface.

BACKGROUND OF THE INVENTION

Referring to FIG. 1, a register access controller 100 of the prior art controls the transfer of data from a register page 102 to a bus interface 104. The register page 102 is comprised of a plurality of registers including a first register 111, a second register 112, a third register 113, and so on, up to a sixty-fourth register 164.

An example application which uses such a transfer of data from a register page to a bus interface is an Ethernet computer network peripheral device installed within a computer to interface that computer to a network of computers. In that example, the register page 102 with the register access controller 100 is part of the Ethernet computer network peripheral device. Also in that example, the bus interface 104 is a bus interface between the Ethernet computer network peripheral device and the CPU of the computer in which the Ethernet computer network peripheral device is installed.

In that example, each register in the register page 102 may include data packets and other types of data received by the Ethernet computer network peripheral device from the network of computers which may be the Internet. The CPU of the computer in which the Ethernet computer network peripheral device is installed reads the data from the registers within the register page 102 in a mode commonly termed "the slave mode" to further process the data within the register page 102.

The data from each of the registers of the register page 102 is transferred to the bus interface 104 on a register by register basis. Referring to FIG. 1, each register has a respective output driver coupled between that register and the bus interface 104. In FIG. 1, a first output driver 120 is coupled between the first register 111 and the bus interface 104, and so on, with a sixty-fourth output driver 122 being coupled between the sixty-fourth register 164 and the bus interface 104. (Note that the respective output driver corresponding to the other registers aside from the first register 111 and the sixty-fourth register 164 are not shown in FIG. 1 for clarity of illustration.)

Each output driver turns on to couple the respective register corresponding to that output driver to the bus interface 104 or turns off to decouple the respective register to the bus interface 104. A 6-bit address line 124 indicates a selected register of the 64 registers of the register page 102 for being coupled to the bus interface 104. An address decoder 126 decodes the data on the 6-bit address line 124 and generates a first control signal which turns on the respective output driver of the selected register. In FIG. 1, the first control signal may be a high output at an output line coupled to the respective output driver of the selected register and low outputs at output lines coupled to the respective output driver of the rest of the plurality of registers of the register page 102.

A memory unit of an Ethernet computer network peripheral device may be organized into a plurality of register pages. In that case, a register page select input 128 is included to indicate which register page of the plurality of register pages is currently being read. In FIG. 1, the register page select input 128 is in a high state if the register page 102 of FIG. 1 of the plurality of register pages is selected for data transfer to the bus interface 104. The register page select input 128 is in a low state if the register page 102 of FIG. 1 of the plurality of register pages is not selected for data transfer to the bus interface 104.

In FIG. 1, a respective AND gate is coupled to each output driver. A first AND gate 130 is coupled to the first output driver 120, and so on, with a sixty-fourth AND gate 132 being coupled the sixty-fourth output driver 122. A first input of each AND gate is coupled to the register page select input 128, and a second input of each AND gate is coupled to a respective output line of the address decoder 126. When the register page select input 128 is a low state, the register page 102 of FIG. 1 of the plurality of register pages is not selected for data transfer to the bus interface 104. Thus, the output of all AND gates are low and controls each output driver to turn off to decouple all registers of the register page 102 from the bust interface 104.

When the register page select input 128 is a high state, the register page 102 of FIG. 1 is selected for data transfer to the bus interface 104. In that case, the respective AND gate of a selected register has a high input from the address decoder. Then, that AND gate with a high output drives the respective output driver of that selected register to turn on to couple the selected register to the bus interface 104.

Assuming that the register page 102 of FIG. 1 has been selected for data transfer to the bus interface (i.e. the register page select input 128 is in a high state), data from the plurality of registers of the register page 102 is transferred to the bus interface 104 on a register by register basis. For speed optimized data transfer commonly called "zero-wait continuous burst data transfer", data from a different register is transferred to the bus interface 104 every clock period.

Referring to FIG. 2, a clock signal 202 includes a periodic transition at the beginning 204 of every period of the clock signal. A period of the clock signal is indicated by a time period 206. In zero-wait continuous burst data transfer, the 6-bit address line 124 changes to indicate a different selected register of the plurality of register 102 at every periodic transition of the clock signal. Thus, with zero-wait continuous burst data transfer, data is transferred from a different selected register during every period of the clock signal 202 maximizing the amount of data transferred from the register page 102 to the bus interface for a given amount of time.

Referring to FIGS. 1 and 2, assume that the first register 111 is the selected register during the first period 206 of the clock signal 202. A first control signal 208 for the first register 111 from the address decoder 126 goes high at the beginning of the first period 206 and goes low after the end of the first period 206. The first control signal 208 is an input to the first AND gate 130 and turns on the first output driver 120 during its high state.

Assume also that the sixty-fourth register 164 is the next selected register during a second period 210 of the clock signal 202. A second control signal 212 for the sixty-fourth register 164 from the address decoder 126 goes high at the beginning of the second period 210 and goes low after the end of the second period 210. The second control signal 212 is an input to the sixty-fourth AND gate 132 and turns on the sixty-fourth output driver 122 during its high state.

As illustrated in FIG. 2, if the delay in the first control signal 208 turning back low after the first period 206 is sufficient, then an overlap time 214 may exist where both the first control signal 208 and the second control signal 212 are high. In that case, both the first output driver 120 and the sixty-fourth output driver 122 may be turned on simultaneously during the overlap time 214. When both of those output drivers 122 and 124 are on, both the first register 111 and the sixty-fourth register 164 are coupled to the bus interface (i.e. those two registers 111 and 164 are shorted together). With such a short circuit, high current may flow through this short circuit between the first register 111, the first output driver 120, the sixty-fourth register 164, and/or the sixty-fourth output driver 122. This high current may lead to erratic circuit behavior and even permanent damage to the integrated circuit including the register page 102. Thus, it would be desirable to prevent simultaneous coupling of more than one register of the register page 102 to the bus interface 104.

SUMMARY OF THE INVENTION

Accordingly, a primary object of the present invention is to control coupling of a selected register of a plurality of registers to a bus interface during a zero-wait continuous burst transfer of data from the plurality of registers to the bus interface to prevent simultaneous coupling of more than one register to the bus interface.

In a general aspect of the present invention, a register access controller includes a respective output driver, coupled between a respective register of the plurality of registers and the bus interface, that turns on to couple the respective register to the bus interface and that turns off to decouple the respective register from the bus interface. In addition, the register access controller includes a clock signal input to accept a clock signal having a periodic transition for every period of the clock signal and includes an address line for carrying a register address of the selected register to be coupled to the bus interface. In the zero-wait continuous burst transfer of data, the register address of the selected register changes with every periodic transition of the clock signal. Furthermore, an address decoder, coupled to the address line and to each respective driver, decodes the register address on the address line to provide a register control signal which turns on the respective output driver of the selected register. The register access controller further includes an driver delaying unit, coupled to the clock signal input and each respective output driver, for providing an enable control signal which turns the respective output driver of each of the plurality of registers off for a predetermined delay time at each periodic transition of the clock signal. The respective output driver of the selected register is then turned on by the register control signal for a remainder time after the predetermined delay time during each period of the clock signal.

The present invention may be used to particular advantage when the plurality of registers and the register access controller are part of an Ethernet computer network peripheral device within a computer having a CPU (Central Processing Unit). In that case, the bus interface is coupled between the Ethernet computer network peripheral device and the CPU of the computer, and the CPU reads data from the plurality of registers in a slave mode.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference numeral in FIGS. 1–4 refer to elements with similar structure and function.

DETAILED DESCRIPTION

Figure 1:
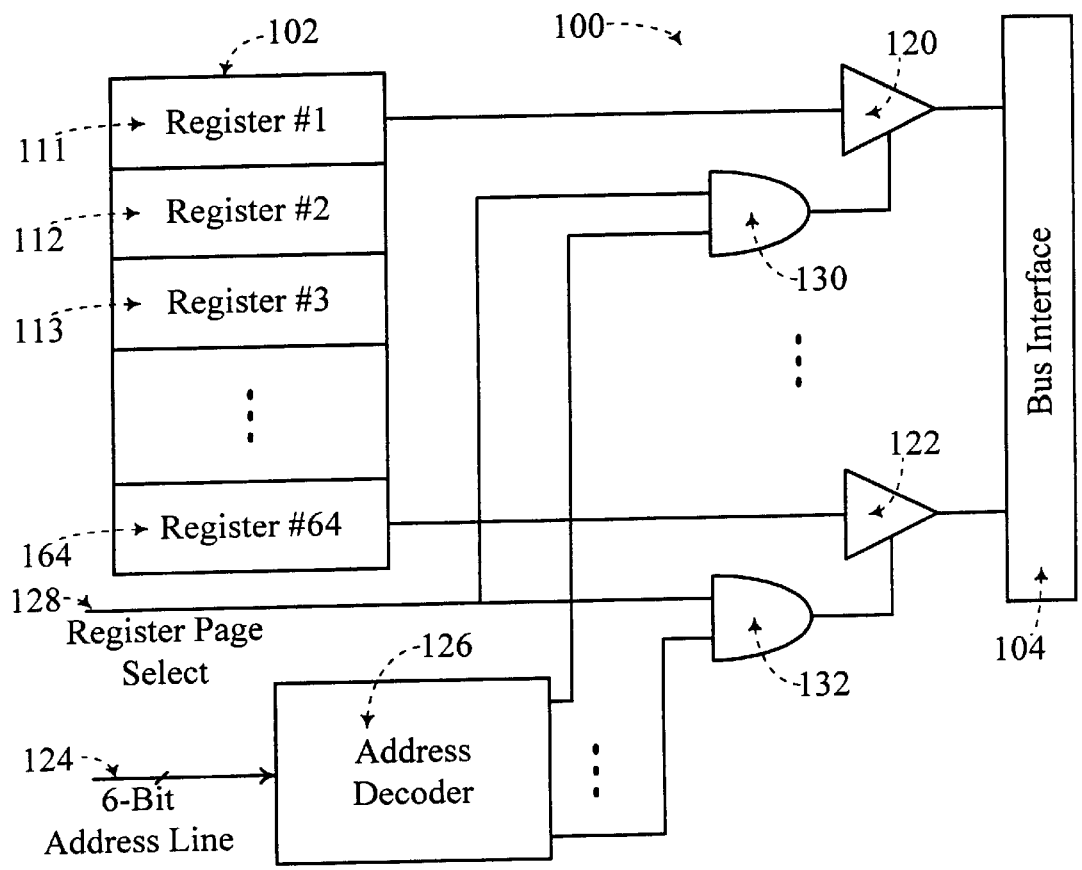
FIG. 1 shows a register access controller of the prior art which may not prevent two registers being coupled to a bus interface at the same time.
Figure 2:
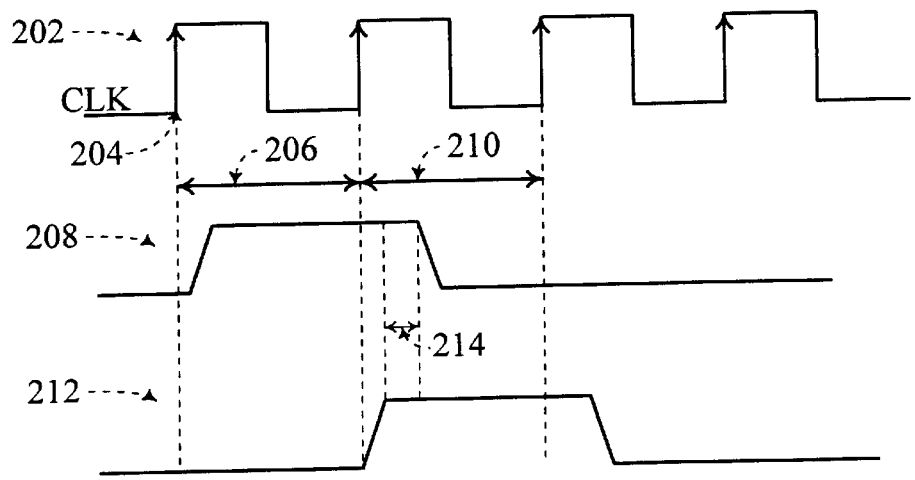
FIG. 2 shows an example timing diagram of a clock signal and register control signals used in the prior art register access controller of FIG. 1.
Figure 3:
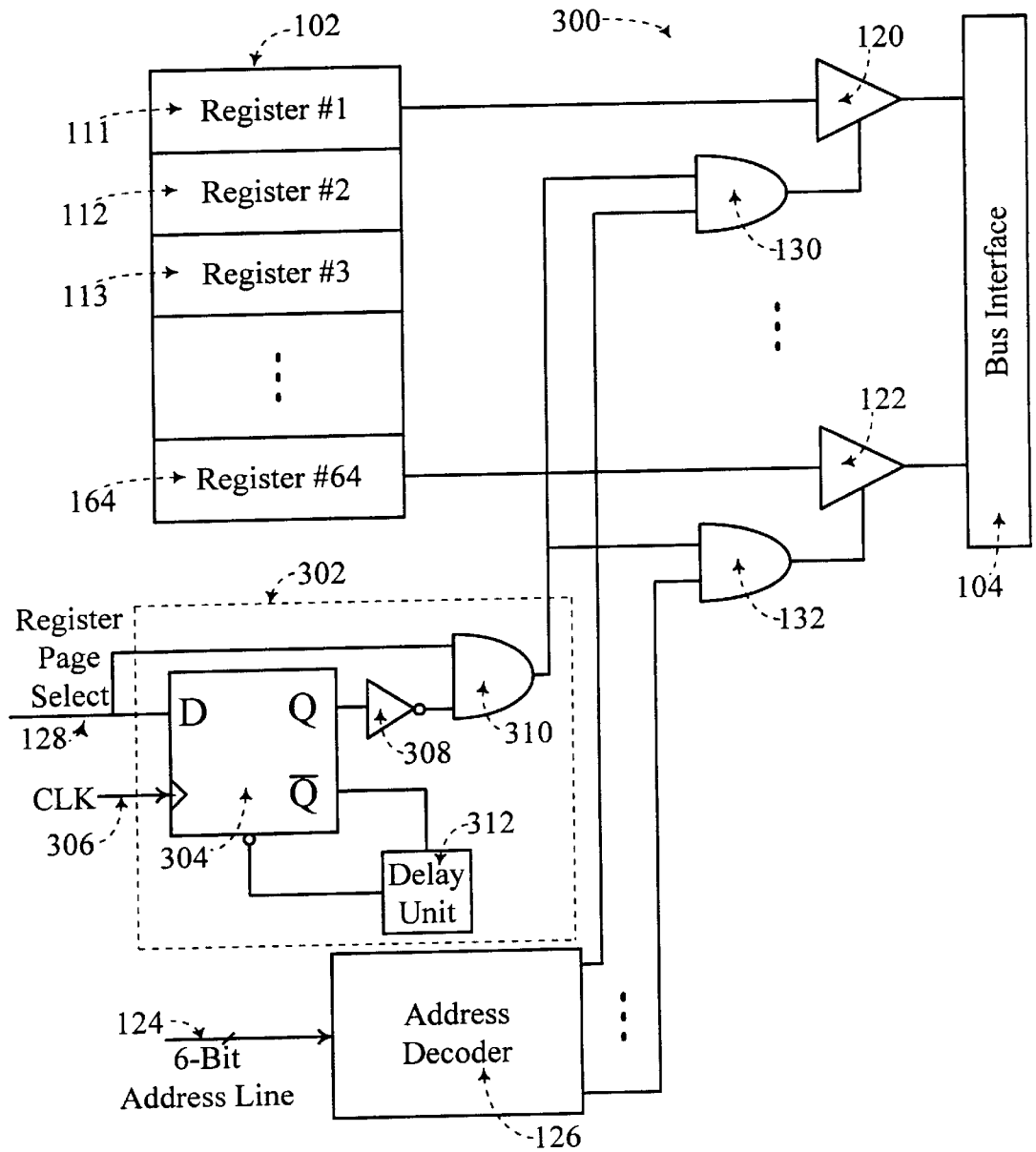
FIG. 3 shows a register access controller which prevents two registers being coupled to a bus interface at the same time, according to a preferred embodiment of the present invention.

Referring to FIG. 3, a register access controller 300 of the present invention includes additional components to the prior art register access controller 100 of FIG. 1. (Elements having the same reference number in FIGS. 1 and 3 refer to elements having similar structure and function.) The register access controller 300 of FIG. 3 includes a driver delaying unit 302 (as shown within dashed lines) for preventing simultaneous coupling of more than one register from the register page 102 to the bus interface 104.

The driver delaying unit 302 includes a delay flip flop 304 driven by a clock signal at a clock signal input 306. The D-input of the delay flip flop 304 is coupled to the register page select input 128. The Q-output of the delay flip flop 304 is coupled through an inverter 308 to a first input of a control AND gate 310. The register page select input 128 is coupled to a second input of the control AND gate 310. The inverted Q-output of the delay flip flop 304 is coupled via a delay unit 312 to a reset input of the delay flip flop 304.

Figure 4:
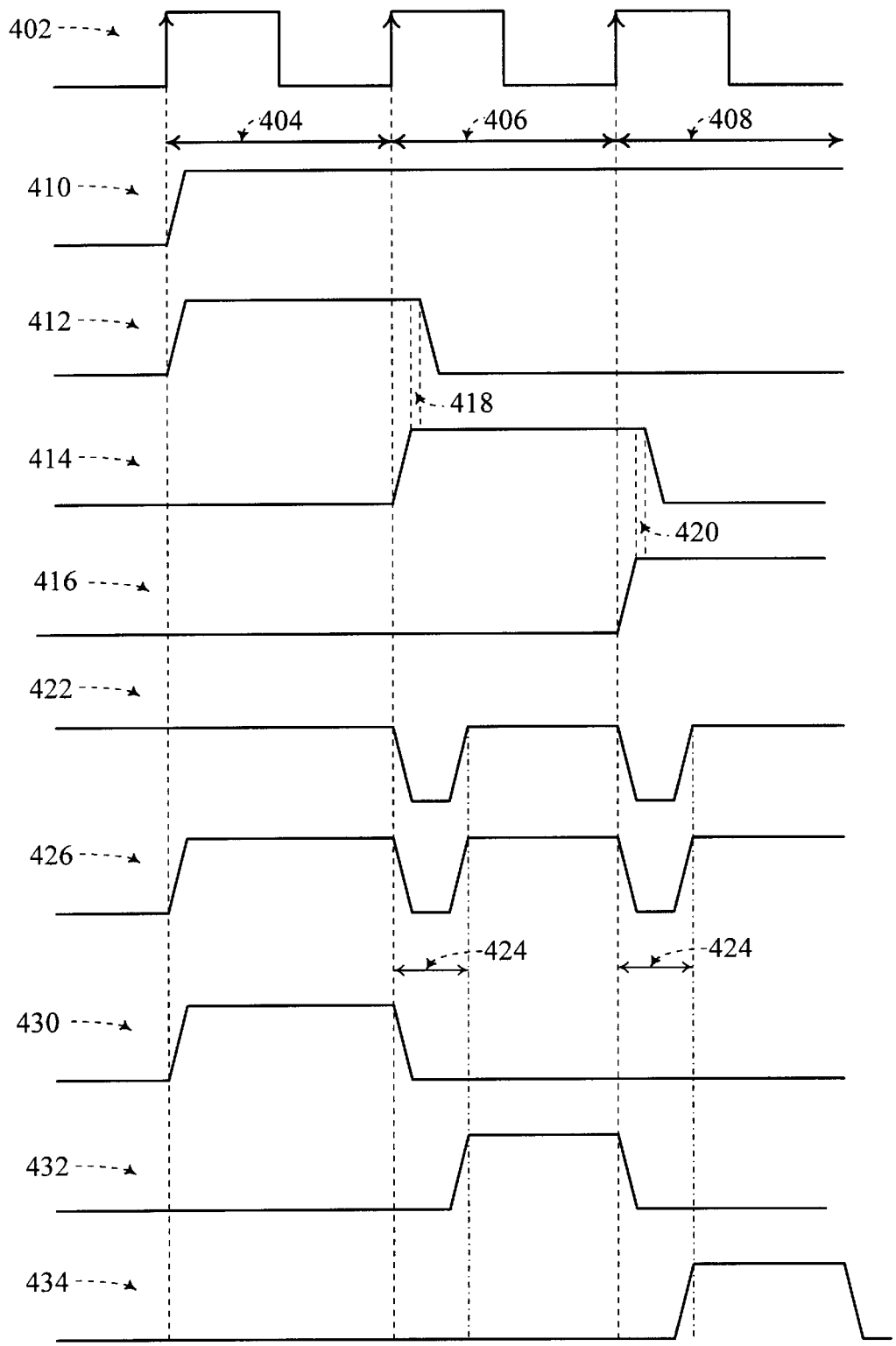
FIG. 4 shows an example timing diagram of a clock signal and control signals used in the register access controller of FIG. 3, according to a preferred embodiment of the present invention.

The operation of the register access controller 300 of the present invention is described with reference to the timing diagrams of FIG. 4. The clock signal input 306 accepts a clock signal 402 of FIG. 4. The clock signal 402 has a periodic transition at the beginning of each period when the data on the 6-bit address line 124 changes to specify a different selected register from the register page 102 to be coupled to the bus interface 104. In FIG. 4, a first period 404, a second period 406, and a third period 408 of the clock signal 402 are shown.

Assume that the register page 102 is selected for reading the contents of that register page 102 from a plurality of similar such register pages at the beginning of the first period 404 of the clock signal 402. In that case, the register page select input 128 turns high as shown by the register page select timing diagram 410 of FIG. 4.

Referring to FIG. 4, a first register control signal 412 from the address decoder is coupled as an input to the first AND gate 130 of the first output driver 120. The first register control signal 412 turns high with the periodic transition at the beginning of the first period 404. A second register control signal 414 from the address decoder is coupled as an input to the sixty-fourth AND gate 132 of the sixty-fourth output driver 122. The second register control signal 414 turns high with the periodic transition at the beginning of the second period 406. A third register control signal 416 from the address decoder is coupled as an input to an AND gate of another output driver such as a respective output driver corresponding to the second register 112 (not shown in FIG.

3). The third register control signal 416 turns high with the periodic transition at the beginning of the third period 406. Each register control signal may turn on the respective output driver to couple the respective register to the bus interface 104.

However, note that the first register control signal 412, the second register control signal 414, and the third register control signals 416 have an overlap time where two register control signals are high at the same time due to delay in one register control signal turning back low as another register control signal turns high. For example, during a first overlap time 418, the first register control signal 412 and the second register control signal 416 are both high at the same time, and during a second overlap time 420, the second register control signal 414 and the third register control signal 416 are both high at the same time. If these register control signals alone control respective output drivers to turn on when the register control signals are high, then two output drivers may turn on at the same time creating a short circuit between two registers within the register page 102. Such a short circuit may cause damage to the integrated circuit having the register page 102.

To prevent this situation of two output drivers turning on at the same time, the driver delaying unit 302 provides a further enable control signal which modifies the first register control signal 412, the second register control signal 414, and the third register control signal 416. A flip flop output signal 422 of FIG. 4 which is the Q-output of the delay flip flop 304 through the inverter 308 turns low at the periodic transition of the second period 406 and of the third period 408 of the clock signal 402. During each period of the clock signal 402, the flip flop output signal 422 turns back high after a predetermined delay time 424 when the inverted Q-output at the delay flip flop 304 resets the output of the delay flip flop 304 after the predetermined delay time 424.

The predetermined delay time 424 is determined by the delay through the delay unit 312 coupled between the inverted Q-output of the delay flip flop 304 and the reset input of the delay flip flop 304 as shown in FIG. 3. The delay unit 312 may be implemented as known to one of ordinary skill in the art of digital systems design (such as by chaining an even number of invertors) for providing the predetermined delay time 424.

The register page select signal 410 and the flip flop output signal 422 are inputs to the control AND gate 310. The output of the control AND gate 310 provides an enable control signal 426. This enable control signal 426 is then an input to each respective AND gate which enables a respective output driver to turn on. The respective register control signal from the address decoder 126 is the other input to each such AND gate, and the output of each such AND gate is a respective enable signal for controlling the turning on or off of a respective output driver.

For example, if the first register control signal 412 is an input to the first AND gate 130, the enable control signal 426 is the other input to the first AND gate 130. The output of the first AND gate 130 provides a first enable signal 430 of FIG. 4. The first enable signal 430 drives the first output driver 120 to turn on when the first enable signal 430 is high during the first period 404 of the clock signal 402.

If the second register control signal 414 is an input to the sixty-fourth AND gate 132, the enable control signal 426 is the other input to the sixty-fourth AND gate 132, and the output of the sixty-fourth AND gate 132 provides a second enable signal 432 of FIG. 4. The second enable signal 432 drives the sixty-fourth output driver 122 to turn on when the second enable signal 432 is high during the second period 406 of the clock signal 402.

Note that during the predetermined delay time 424 after the beginning of the second period 406, the first output driver 120 turns off and the sixty-fourth output driver 122 turns on. The predetermined delay time 424 is sufficient to ensure that both the output driver that is turning off (i.e. the first output driver 120 in this example) and the output driver that is turning on (i.e. the sixty-fourth output driver 122 in this example) are not turned on at a same time near a periodic transition of the clock signal 402. The predetermined delay time 424 ensures a time when all output drivers are turned off to decouple all registers of the register page 102 from the bus interface 104 during a transition of decoupling one register from the bus interface 104 to coupling another register to the bus interface 104. After this predetermined delay time 424 from the beginning of a period in the clock signal 402, the respective output driver of a next selected register is turned on for a remainder time of the period of the clock signal 402 to couple that register to the bus interface 104.

In a similar manner, a third enable signal 434 drives another output driver for coupling another register of the register page 102 during the third period 408 of the clock signal 402 after data from the sixty-fourth register 164 has been read during the second period 406 of the clock signal 402. Again, the predetermined delay time 424 ensures a smooth transition of decoupling the sixty-fourth register 164 from the bus interface 104 to the coupling of a next selected register to the bus interface 104.

In this manner, the register access controller 300 of the present invention provides a predetermined delay time at each periodic transition of the clock signal 402 between the time when the previously selected register is decoupled from the bus interface 104 and when the next selected register is coupled to the bus interface 104. Such a predetermined delay time ensures that all registers of the register page 102 are decoupled from the bus interface 104 before a next selected register is coupled to the bus interface 104. Such decoupling prevents simultaneous coupling of more than one register to the bus interface 104. Thus, the zero-wait continuous burst transfer of data from the register page 102 to the bus interface 104 may be used for high speed data transfer without damage that may result to the integrated circuit having the register page 102 when two registers are shorted together.

The foregoing is by way of example only and is not intended to be limiting. For example, the present invention may be implemented for any number of register pages. In that case, a respective register access controller such as that of FIG. 3 is provided for each register page. Moreover, the present invention may be practiced for any number of registers within the register page 102 and for reading the registers of the register page 102 in any order. The invention is limited only as defined in the following claims and equivalents thereof.

I claim:

1. A register access controller for controlling coupling of a selected register, of a plurality of registers, to a bus interface during a zero-wait continuous burst transfer of data from the plurality of registers to the bus interface, the register access controller comprising:

a respective output driver, coupled between a respective register of the plurality of registers and the bus interface, that turns on to couple the respective register to the bus interface and that turns off to decouple the respective register from the bus interface;

a clock signal input for accepting a clock signal having a periodic transition for every period of the clock signal, a selected register of the plurality of registers being chosen at every periodic transition of the clock signal for coupling to the bus interface, a register control signal turning on the respective output driver of the selected register; and a driver delaying unit, coupled to the clock signal input and each respective output driver, for providing an enable control signal which turns the respective output driver of each of the plurality of registers off for a predetermined delay time at each periodic transition of the clock signal, wherein the respective output driver of the selected register is turned on by the register control signal for a remainder time after the predetermined delay time during each period of the clock signal.

2. The register access controller of claim 1, further comprising:

an address line for carrying a register address of the selected register to be coupled to the bus interface, the register address of the selected register changing with every periodic transition of the clock signal; and an address decoder, coupled to the address line and to each respective driver, for decoding the register address on the address line to provide the register control signal which turns on the respective output driver of the selected register.

3. The register access controller of claim 1, wherein the driver delaying unit includes:

a delay flip flop driven by the clock signal and having a reset input coupled to a delay element with a delay of the predetermined delay time to generate the enable control signal.

4. The register access controller of claim 1, wherein the plurality of registers comprise a register page and wherein the register access controller further comprises:

a register page select input, coupled to the driver delaying unit, for accepting a register page select signal which is a first state to indicate that the register page of the plurality of registers is selected for the zero-wait continuous burst transfer of data from the register page, and which is a second state to indicate that the register page of the plurality of registers is not selected for the zero-wait continuous burst transfer of data, and wherein the driver delaying unit turns off the respective output driver of each of the plurality of registers when the register page select input is the second state.

5. The register access controller of claim 1, wherein the plurality of registers and the register access controller are part of an Ethernet computer network peripheral device within a computer having a CPU (Central Processing Unit), and wherein the bus interface is coupled between the Ethernet computer network peripheral device and the CPU of the computer, and wherein the CPU reads data from the plurality of registers in a slave mode.

6. A register access controller for controlling coupling of a selected register, of a plurality of registers, to a bus interface during a zero-wait continuous burst transfer of data from the plurality of registers to the bus interface, the register access controller comprising:

a clock signal input for accepting a clock signal having a periodic transition for every period of the clock signal, a selected register of the plurality of registers being chosen at every periodic transition of the clock signal for coupling to the bus interface;

means for decoupling all of the plurality of registers from the bus interface for a predetermined delay time at each periodic transition of the clock signal; and means for coupling the selected register to the bus interface for a remainder time after the predetermined delay time during each period of the clock signal.

7. The access controller of claim 6, further comprising:

an address line for carrying a register address of the selected register to be coupled to the bus interface, the register address of the selected register changing with every periodic transition of the clock signal.

8. The register access controller of claim 6, wherein the plurality of registers comprise a register page and wherein the register access controller further comprises:

a register page select input for accepting a register page select signal which is a first state to indicate that the register page of the plurality of registers is selected for the zero-wait continuous burst transfer of data from the register page, and which is a second state to indicate that the register page of the plurality of registers is not selected for the zero-wait continuous burst transfer of data; and means for decoupling each of the plurality of registers from the bus interface when the register page select input is the second state.

9. The register access controller of claim 6, wherein the plurality of registers and the register access controller are part of an Ethernet computer network peripheral device within a computer having a CPU (Central Processing Unit), and wherein the bus interface is coupled between the Ethernet computer network peripheral device and the CPU of the computer, and wherein the CPU reads data from the plurality of registers in a slave mode.

10. A method for controlling coupling of a selected register, of a plurality of registers, to a bus interface during a zero-wait continuous burst transfer of data from the plurality of registers to the bus interface, the method including the steps of:

accepting a clock signal having a periodic transition for every period of the clock signal, a selected register of the plurality of registers being chosen at every periodic transition of the clock signal for coupling to the bus interface;

decoupling each of the plurality of registers from the bus interface for a predetermined delay time at each periodic transition of the clock signal; and coupling the selected register to the bus interface for a remainder time after the predetermined delay time during each period of the clock signal.

11. The method of claim 10, further including the steps of:

accepting a register address of the selected register to be coupled to the bus interface, the register address of the selected register changing with every periodic transition of the clock signal; and decoding the register address on the address line to provide a register control signal which couples the selected register to the bus interface.

12. The method of claim 10, wherein the plurality of registers comprise a register page and wherein the method further includes the step of:

accepting a register page select signal which is a first state to indicate that the register page of the plurality of registers is selected for the zero-wait continuous burst transfer of data from the register page, and which is a second state to indicate that the register page of the plurality of registers is not selected for the zero-wait continuous burst transfer of data; and decoupling each of the plurality of registers when the register page select input is in the second state.

13. The method of claim 10, wherein the plurality of registers are part of an Ethernet computer network peripheral device within a computer having a CPU (Central Processing Unit), and wherein the bus interface is coupled between the Ethernet computer network peripheral device and the CPU of the computer, and wherein the CPU reads data from the plurality of registers in a slave mode.

* * * * *